Patented Dec. 27, 1932  1,892,245

UNITED STATES PATENT OFFICE

FRITZ MIETZSCH AND HEINRICH KLÖS, OF ELBERFELD, GERMANY, ASSIGNORS TO WINTHROP CHEMICAL COMPANY, INC., OF NEW YORK, N. Y., A CORPORATION OF NEW YORK

SUBSTITUTED AMINO-PHENYL-ARSONIC ACID

No Drawing. Application filed January 21, 1930, Serial No. 422,484, and in Germany January 29, 1929.

The present invention relates to new substituted 4-aminophenyl-arsonic acid compounds.

The 4-(ω-amino- or alkylaminoalkylamino)-phenyl-arsonic acids of the formula:

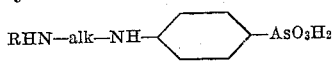

wherein R means H or alkyl and "alk" means an alkylene group, being obtainable by causing an aminoalkyl- or alkylaminoalkyl-halide to react on arsanilic acid (see British Patent No. 326,789) are therapeutically valuable products.

In accordance with the present invention by acylating the 4- ω-amino-alkylamino)-phenyl-arsonic acids or the substitution products thereof there are obtained new compounds of the probable general formula:

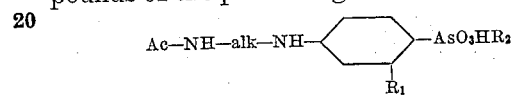

wherein Ac stands for a substituted or unsubstituted acyl group, for example, formyl, acetyl, propionyl, isobutyryl, valeryl, benzoyl, aminoacetyl, aminobenzoyl and the like, "alk" stands for an aliphatic normal or branched alkylene or hydroxy alkylene group, for example, methylene, ethylene, propylene, hydroxy propylene, isobutylene and the like, $R_1$ means H, OH or halogen, $R_2$ means H or an alkali or alkaline earth metal. These new compounds possess a less basic character and less solubility than the parent compounds and are distinguished by their stronger action against blood parasites, by a good resorption when taken per os and by their intoxicity.

The new process consists in boiling an organic acid of the stated kind with the 4-(ω-amino alkyl-amino)-phenyl-arsonic acid or a substitution product thereof or in reacting upon the 4-(ω-aminoalkylamino)-phenyl-arsonic acids or the substitution products thereof with an anhydride or a halide of the organic acids above stated in the customary manner. The new products are preferably separated in the form of their alkali metal salts in the usual manner, if necessary, after adding the requisite amount of a caustic alkali lye, for example, by evaporating the reaction mixture to dryness, dissolving the residue in alcohol and pouring the solution obtained into a suitable organic precipitant, such as ether or acetone. Sometimes, however, the acids themselves separate already during the acylating process.

The new acylated 4-(ω-aminoalkyl-amino)-phenyl-arsonic acids and their alkali or alkaline earth metal salts are white or pale colored substances. The acids are soluble in mineral acids forming the corresponding salts with the mineral acids; they are, furthermore, soluble in alkali lyes forming the corresponding alkali metal salts; they are insoluble in acetone and ether and diluted acetic acid and sparingly soluble in water, alkyl and methyl alcohol. The alkali metal salts dissolve in water and alcohols, they are insoluble in acetone and ether and can be precipitated by the latter from their alcoholic solutions.

The invention is illustrated by the following examples without being restricted thereto:—

*Example 1.*—26 grams of 4-aminoethylamino-phenyl-arsonic acid of the probable formula:

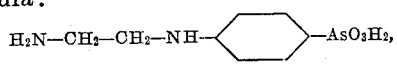

obtainable by reacting upon arsanilic acid with ω-bromoethyl-phthalimide and saponifying the intermediate product obtained, are dissolved in 100 cc. of normal caustic soda lye and 150 cc. of water. The solution is heated to about 90° C. and at once mixed with 20 grams of acetic acid anhydride as soon as boiling of the mixture takes place. After removing the excess of acetic acid anhydride the solution is evaporated in vacuo to dryness. The sodium salt of the 4-ω-acetylamino-ethylamino)-phenyl-arsonic acid of the probable formula:

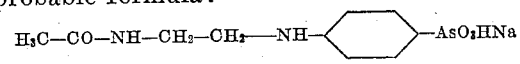

is obtained by taking up the residue in absolute alcohol, filtering the solution and by adding ether to it. It is soluble in water, methyl and ethyl alcohol, insoluble in acetone and ether, so that it can be precipitated also by acetone from its alcoholic solution. By the addition of hydrochloric or acetic acid to its aqueous solution no precipitate is obtained.

*Example 2.*—In accordance with the process described in Example 1 from 4-(ω-aminopropylamino)-phenyl-arsonic acid the sodium salt of the 4-(ω-acetylaminopropylamino)-phenylarsonic acid of the probable formula:

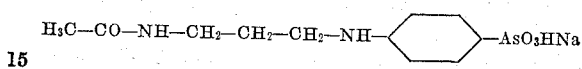

is obtained, displaying the same properties as the sodium salt of the corresponding ethyl compound.

*Example 3.*—When replacing the 4-(ω-aminoethylamino)-phenyl-arsonic acid in the process described in Example 1 by the 4-(ω-aminoethylamino)-2-chloro-phenyl-arsonic acid, the sodium salt of the 4-(ω-acetylamino-ethylamino)-2-chloro-phenyl-arsonic acid of the probable formula:

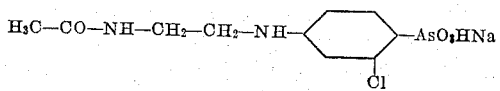

is obtained displaying properties similar to those of the sodium salt of Example 1.

*Example 4.*—When replacing the 4-(ω-aminoethylamino)-phenyl-arsonic acid in the process described in Example 1 by the 4-(ω-aminoethylamino)-2-hydroxy-phenyl-arsonic acid the sodium salt of the 4-(ω-acetylamino-ethylamino)-2-hydroxy-phenyl-arsonic acid of the probable formula:

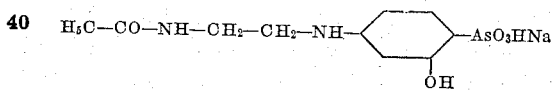

is obtained, displaying properties similar to those of the sodium salt of Example 1.

*Example 5.*—5.6 grams of 4-(ω-aminoethylamino)-phenyl-arsonic acid are dissolved in 21.5 cc. of normal caustic soda lye and 60 cc. of water and mixed drop by drop with 4.5 cc. of benzoyl chloride at a temperature of about 50 to 60° C. The benzoylated product formed precipitates on further heating and can be sucked off after cooling. It is dried in vacuo and extracted with ether for removing benzoic acid and three times with 15% acetic acid for removing the unchanged starting material. The residue obtained is the pure 4-(ω-benzoylaminoethylamino)-phenyl-arsonic acid of the probable formula:

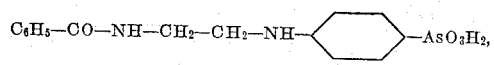

being easily soluble in diluted caustic alkali and soda lye in contradistinction to the starting material and likewise easily soluble in diluted hydrochloride acid, but insoluble in 15% acetic acid wherein the starting material dissolves. It scarcely precipitates from its diluted hydrochloric acid solution by sodium acetate as does the starting material. Furthermore the benzoylated acid is sparingly soluble in water, methyl and ethyl alcohol, insoluble in acetone and ether.

*Example 6.*—13 grams of 4-(ω-aminoethylamino)-phenyl-arsonic acid are dissolved in 50 cc. or normal caustic soda lye and mixed with 9.5 grams of 3-nitrobenzoyl-chloride at a temperature of about 60 to 70° C. The solution is heated in a boiling water bath until the acylated product has separated. After cooling it is sucked off, dried and extracted with ether and 10% acetic acid. Then the product obtained is dissolved in the calculated amount of normal caustic soda lye and reduced by heating with iron borings and some diluted acetic acid. Then the solution is sucked off from the iron sludge and evaporated in vacuo to dryness. The 4-(ω-3'-aminobenzoyl-aminoethylamino)-phenyl-arsonic acid remains in the form of its sodium salt of the probable formula:

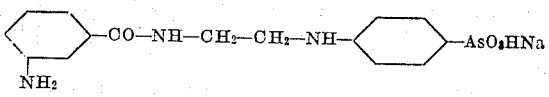

as a pale grey powder, being easily soluble in mineral acids.

*Example 7.*—130 grams of aminoacetic-acid-chloride-hydrochloride are added to a solution of 260 grams of 4-(ω-aminoethylamino)-phenyl-arsonic acid in 1000 cc. of normal caustic soda lye. The mixture is heated for about 2 to 3 hours in a boiling water bath. After adding 200 cc. of 10% normal caustic soda lye the mixture is evaporated at a low temperature in vacuo. From the residue the sodium chloride formed is separated by dissolving in absolute alcohol. By precipitating the filtered solution with ether, the sodium salt of the 4-(ω-aminoacetylaminoethylamino)-phenyl-arsonic acid of the probable formula:

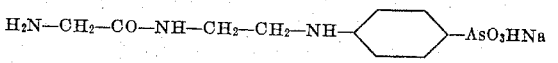

is obtained, being a white hygroscopic powder.

*Example 8.*—125 grams of valeryl chloride are added to a solution of 260 grams of 4-(ω-aminoethylamino)-phenyl-arsonic acid in 1000 cc. of normal caustic soda lye. The mixture is heated to about 60 to 70° C. for about 2 hours. After cooling and adding 100 cc. of 10% normal caustic soda lye the solution is evaporated to dryness in vacuo at a temperature as low as possible. The residue is taken up in absolute alcohol and filtered off from the insoluble sodium chloride. From the solution obtained the sodium salt of the 4-(ω-valerylaminoethylamino)-phenyl-arsonic acid of the probable formula:

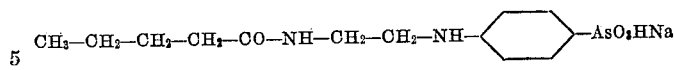

is precipitated by ether. It is a white hygroscopic powder.

In a similar way, by applying the chlorides of the higher aliphatic carboxylic acids, for example, decyl-acid chloride, stearic acid chloride and the like, the corresponding acylated 4-(ω-aminoalkylamino)-arsonic acids are obtainable.

We claim:

1. The compounds of the probable general formula:

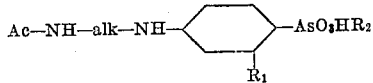

wherein Ac stands for an acyl group, alk stands for an alkylene radical which may be substituted by a hydroxy group, $R_1$ stands for hydrogen, halogen or the hydroxy group and $R_2$ stands for hydrogen, alkali metal or alkaline earth metal, these new compounds being whitish powders of weakly basic character, soluble in alcohol and water and insoluble in acetone and ether.

2. The compounds of the probable general formula:

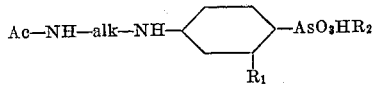

wherein Ac stands for an aliphatic acyl group, alk stands for an alkylene radical which may be substituted by a hydroxy group, $R_1$ stands for hydrogen, halogen or the hydroxy group and $R_2$ stands for hydrogen, alkali metal or alkaline earth metal, these new compounds being whitish powders of weakly basic character, soluble in alcohol and water and insoluble in acetone and ether.

3. The compounds of the probable general formula:

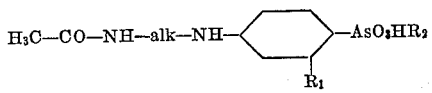

wherein alk stands for an alkylene radical which may be substituted by a hydroxy group, $R_1$ stands for hydrogen, halogen or the hydroxy group and $R_2$ stands for hydrogen, alkali metal or alkaline earth metal, these new compounds being whitish powders of weakly basic character, soluble in alcohol and water and insoluble in acetone and ether.

4. The compound of the probable formula:

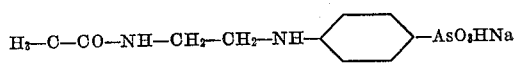

said compound being soluble in water, methyl and ethyl alcohol and insoluble in acetone and ether.

5. The compound of the probable formula:

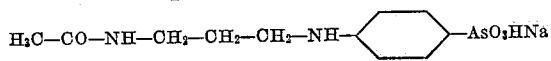

said compound being soluble in water, methyl and ethyl alcohol and insoluble in acetone and ether.

6. The compounds of the probable general formula:

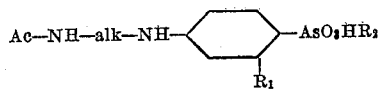

where Ac stands for an aromatic acyl group, alk stands for an alkylene radical which may be substituted by a hydroxy group, $R_1$ stands for hydrogen, halogen or the hydroxy group and $R_2$ stands for hydrogen, alkali metal or alkaline earth metal, these new compounds being whitish powders of weakly basic character, soluble in alcohol and water and insoluble in acetone and ether.

7. The compounds of the probable general formula:

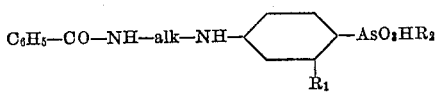

wherein alk stands for an alkylene radical which may be substituted by a hydroxy group, $R_1$ stands for hydrogen, halogen or the hydroxy group and $R_2$ stands for hydrogen, alkali metal or alkaline earth metal, these new compounds being whitish powders of weakly basic character, soluble in alcohol and water and insoluble in acetone and ether.

8. The compound of the probable formula:

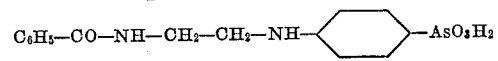

said compound being easily soluble in diluted caustic alkali, soda lye or hydrochloric acid, but insoluble in acetic acid of 15% strength.

In testimony whereof, we affix our signatures.

FRITZ MIETZSCH.
HEINRICH KLÖS.